July 13, 1971  M. R. DECKER  3,592,769

GROOVED REPLACEABLE FILTER TUBE

Original Filed Jan. 2, 1968  2 Sheets-Sheet 1

INVENTOR.
MILTON R. DECKER
BY John A. McKinney
ATTORNEY

INVENTOR.
MILTON R. DECKER
BY
ATTORNEY

United States Patent Office 3,592,769
Patented July 13, 1971

3,592,769
GROOVED REPLACEABLE FILTER TUBE
Milton Richard Decker, Manhattan Beach, Calif., assignor to Johns-Manville Corporation, New York, N.Y.
Continuation of application Ser. No. 695,019, Jan. 2, 1968. This application Feb. 16, 1970, Ser. No. 10,099
Int. Cl. B01d 29/32
U.S. Cl. 210—491          17 Claims

ABSTRACT OF THE DISCLOSURE

A glass fiber filter tube having a plurality of grooves of nonuniform radial depth extending from one cylindrical surface toward but not through the other cylindrical surface of the tube is disclosed herein. The bottom walls of the groove may be straight or arcuate and their ends may be arranged in longitudinally extending rows separated by imperforate portions of one tube wall surface, and each row contains a plurality of such grooves separated by lands. The filter is a replaceable unit useful for removing solids and immiscible liquids from a fluid stream.

This application is a continuation of my prior copending application S.N. 695,019, filed Jan. 2, 1968, and now abandoned.

BACKGROUND

This invention relates to replaceable filter tubes for use in removing contaminants from fluids such as water, paints, resins, oils, petrochemicals and air and other gases.

In the past, fibrous filter tubes have been made by several methods and from a variety of fibres. Some filter tubes have been formed by an accretion process in which cellulosic or wool fibers mixed with a resinous binder are sucked from a slurry onto the outer surface of a tubular screen or mold, as disclosed in U.S. Pats. Nos. 2,539,767 and 2,539,768, for example. Other filter tubes have been made by helically winding on a core successive crisscrossing layers of a continuous yarn of natural fibers, such as cotton and jute, or synthetic fibers such as rayon, nylon and glass. Still other filter tubes have been made by methods including the basic steps of the more widely used methods of making tubular glass fiber insulation. In the latter methods, as illustrated in U.S. Pats. Nos. 2,331,146, 2,428,653, 2,778,759, and 3,063,887 a thin web or a mat of glass fibers including an unset resinous binder is wound or wrapped convolutely on a mandrel to form a tube which is consolidated to the desired degree before the binder is fully set and the mandrel removed. Filter tubes produced by similar methods are illustrated in U.S. Pats. Nos. 3,061,107 and 3,209,916.

Where the structural integrity of the filter tube can be maintained, it is often desirable to provide, in the surface through which the fluid to be filtered will enter, a series of grooves functioning to increase the effective filtering area of the surface. In the past such grooves have been of a uniform radial depth and either cylindrical or semicylindrical in shape. To achieve the maximum increase in effective filtering area, it is desirable to provide as many grooves as possible in the surface of fluid entry, by increasing the number of grooves results in thinner and weaker lands or ridges between the grooves and a tendency for the lands to bend into the grooves or, particularly with the lands at each end of the tube, to break at their bases and be displaced axially. Such bending or displacement of the lands frequently interferes with filtration to the point where the advantage normally to be derived from the grooves is largely lost. Displacement or bending of the lands can be lessened by providing between the walls of each groove a suitable number of spaced elements, such as beads of resin for example, acting to resist bending of the lands, but the added cost of such elements makes them undesirable and they do to some extent disturb the normal flow of fluid through the filter.

SUMMARY OF THE INVENTION

I have discovered how to prevent the bending or displacement of lands between the grooves of replaceable filter tubes without adding materially to the cost of manufacturing the tube and without significantly lowering the filtering performance of the tube as compared with previously known grooved filter tubes. This result can be accomplished by replacing the cylindrical or semi-cylindrical grooves of the conventional filter tube with grooves of nonuniform depth. Such an arrangement reduces the area and flexibility of the sidewall area and flexibility of the lands between grooves and also causes the bottom of the grooves to cross a relatively large number of layers of fiber thereby reducing the tendency of the lands to flex and to be displaced axially.

BRIEF DESCRIPTION OF THE DRAWING

My invention will be more fully understood by reference to the accompanying drawing in which.

DETAILED DESCRIPTION OF THE INVENTION

Figure 1:
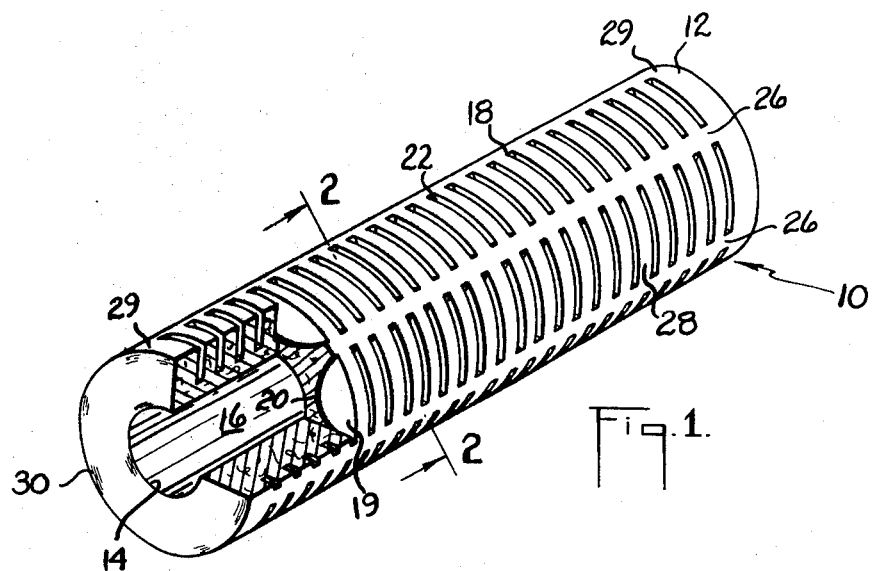
FIG. 1 is a perspective view, with parts cut away and parts shown in sections, of one of the filter tubes of my invention.
Figure 2:
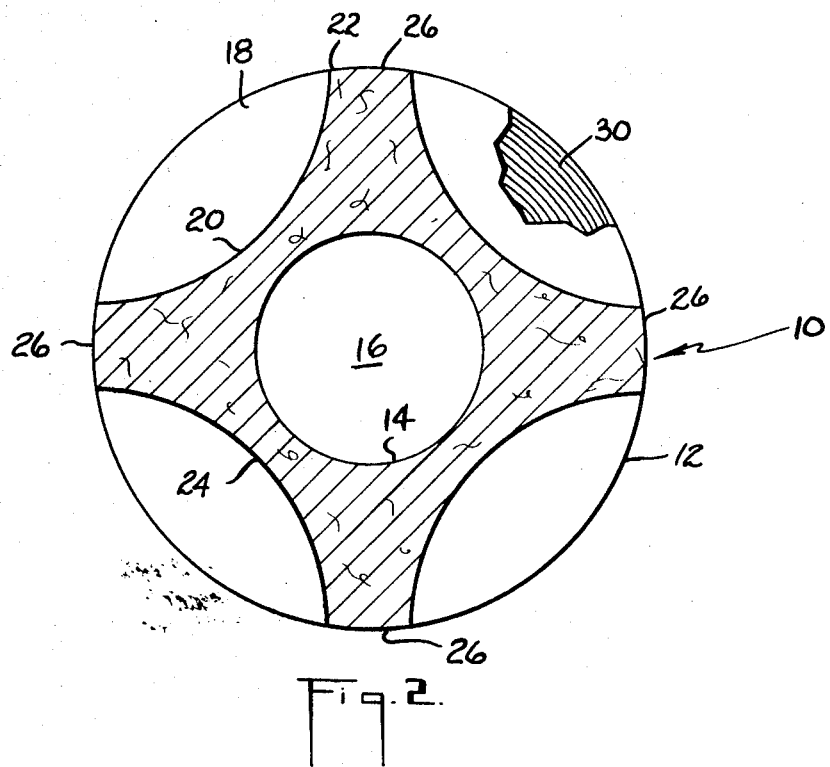
FIG. 2 is a sectional view of the filter tube of FIG. 1, taken on a plane perpendicular to the axis of the tube along line 2—2 of FIG. 1.

Referring now to FIG. 1, 10 indicates generally a replaceable filter tube of fibrous material, having a cylindrical outer peripheral surface 12, and a cylindrical inner surface 14. The outer and inner surfaces 12 and 14 respectively are coaxial, having the axis of the filter tube 10 as their axis. This inner surface 14 surrounds an axially extending passageway 16 which is open at both ends. Grooves 18 extend radially inwardly from the outer surface 12 toward, but not to, the inner surface 14. Each groove may, as shown, be of rectangular cross section with a pair of planar side walls 19 perpendicular to the axis of the tube 10 and an arcuate bottom wall 20 intersecting the two sidewalls 19 at right angles but the grooves may also be V-shaped in cross section. Each groove in the embodiment of FIGS. 1 and 2 is lenticular in shape when viewed in a direction parallel to the axis of tube 10, as in FIG. 2.

One convenient method of forming the grooves of my invention is to arrange a tube to be grooved with its axis parallel to the axis of a rotating shaft to which are fixed a number of circular saw blades of the same diameter lying in parallel planes perpendicular to the axis of the shaft and tube and then moving the tube radially into the saw blades. The tube is then withdrawn, rotated and moved again onto the saw blades. When this method is employed the grooves 18 of my filter tube will be arranged in columns and rows as shown in FIG. 1. Adjacent columns of grooves 18 will then be separated by axially extending separators 26. The outer surface 12 of the filter tube forms the outer surface of separators 26, and the sides of separator 26 are the arcuate bottom walls 20 of the grooves 18. The illustrated filter tube has four columns of grooves 18 and four separators 26 disclosed around the circumference of outside surface 12. The filter tube may have a greater or smaller number of columns of grooves 18, usually three to six columns, if desired.

Axially spaced circumferentially extending lands 28 separate adjacent grooves within each column. The outer surface 12 of the filter tube 10 forms the outer surfaces of lands 28, and the sidewalls 19 of the grooves 18 are the sidewalls of lands 28. The lands 28 are generally of greater width than grooves 18, although this is not essential. At the two ends of the filter tube 10 are a pair of end lands 29 which usually are of greater width than the lands 28 which separate adjacent grooves. In the illustrated embodiment, the lands and adjacent colums are aligned so that, in effect, the lands extend around the entire circumference of the filter tube 10, interrupted by separators 26.

The grooves 18 and lands 28 may, of course, be staggered (not aligned) from column to column and row to row, both axially and circumferentially, but the methods of producing other arrangements will usually involve more than the simple gang-row method described above.

Figure 3:
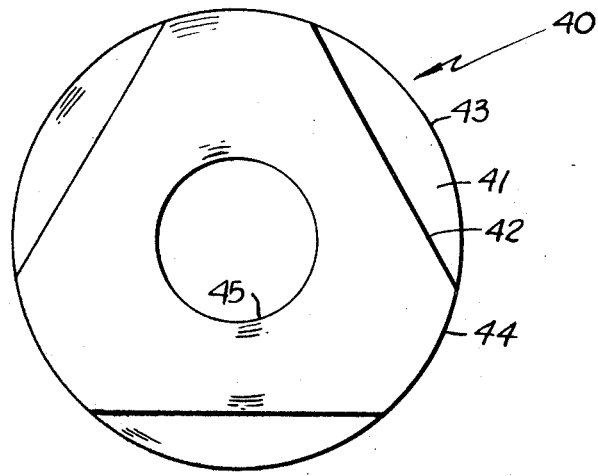
FIGS. 3, 4, and 5 are views similar to FIG. 2 but showing other embodiments of the filter tubes of my invention.

FIG. 3 illustrates a modified form of the invention, in which a filter tube 40 has a plurality of grooves 41 of planoconvex shape. Grooves 41 have straight bottom walls 42 which terminate at their ends in the outer cylindrical surface 43 of tube 40. Separators 44 separate adjacent groove bottom walls 42. Tube 40 also has an inner cylindrical surface 45 enclosing a passageway for fluid. The arrangement of grooves 41 in columns and rows is similar to that shown in FIG. 1.

Figure 4:
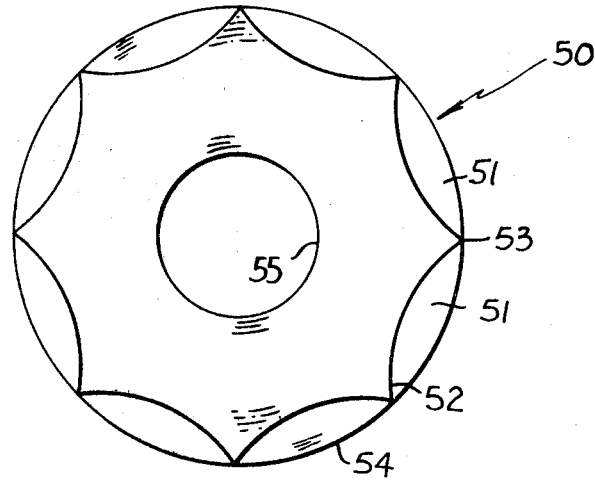

FIG. 4 illustrates another modified form of the invention, showing a filter tube 50 having a plurality of lenticular grooves 51 which touch the adjacent grooves on either side. This embodiment is generally similar to the embodiment shown in FIGS. 1 and 2, except that the bottom walls 52 of grooves 51 touch the bottom walls 52 of the adjacent grooves on either side along edges 53 which are coincident with or close to the outer surface 54 of the tube 50. The filter tube 50 also includes an inner surface 55 providing a central fluid passageway.

The fibrous filter material of the filter tubes 10 may be any of the filter tube materials known in the art, including natural fibers such as cotton and jute, and synthetic fibers such as rayon, nylon and glass. The preferred filter tube materials are glass fibers held together in the form of thin webs or mats by about 5 to about 30% by weight, based on the combined weight of fiber and binder, of a resinous binder, such as a curable phenolformaldehyde resin or melamine-formaldehyde resin. Such fiber-binder compositions are known in the art. The glass fibers may be of a diameter known in the filter tube art.

Any of the various techniques known in the art of making tubes of fibrous material may be used in making filter tubes according to this invention but I prefer to use a method in which a thin web or mat of glass fibers including an unset resinous binder is wound or wrapped spirally on a mandrel and then set, as illustrated, for example, in Pat. 3,063,887. This gives a filter tube which is densest adjacent to the inside surface 14, and least dense adjacent to the outside surface 12. The maximum density of a tube may be as much as twice the minimum density. For instance, a tube having a density of 6 pounds per cubic foot at its outside surface may have a density as high as 12 pounds per cubic foot at its inside surface. The overall, or average, density of filter tubes may range from about 8 to about 15 pounds per cubic foot. A tube of variable density is quite advantageous. Coarser particles are trapped in the outer portions of the filter tube, near the outside surface 12, while finer particles are trapped in the denser portions of the filter tube near inside surface 14.

Alternatively, strips of matted material may by helically wound around the mandrel, as illustrated, for example, in Pat. 3,061,107. In either case, the finished filter tube will have a plurality of thin concentric circumferentially extending layers 30, as seen in FIG. 2. The bottom walls 20 of grooves 18 cut across these layers whereas in filter tubes having cylindrical grooves, cutting of the layers occurs primarily only in the sidewalls. It is possible that the substantial cutting of the layers 30 by both side and bottom walls of grooves 18 may be partially responsible for the good filtration characteristics of the filter tubes herein.

The filter tubes described above can be used advantageously to filter various fluids. One application is in the drycleaning industry, to filter conventional solvents such as perchloroethylene and Stoddard's solvent to remove solid materials such as charcoal and lint. The filter tube of this invention has a much longer life than drycleaner filter tubes presently in use. The filter tube described herein can also be used advantageously in the filtration of paints, including both aqueous latex emulsions and paints having organic solvent thinners. Other liquids and even gases having suspeded solid material can be filtered. In general, the filter tube of this invention gives better results in liquid filtration than in removal of solids from gases.

The filter tubes described above are intended for radial inward flow of the fluid to be filtered. Fluid containing suspended solid matter flows radially inwardly, from a chamber (not shown) surrounding the tube, into grooves 18, thence through the body of the filter tube 10, and is discharged through central passageway 16. Fluid may enter the filter tube body either through lands 28, through the sidewalls 19 of grooves 18, or through the back walls 20 of grooves 18. The filter tube herein has long service life with efficient filtration from the standpoint of flow rate and clarity. The filter tube of this invention has a large surface area while at the same time having good structural strength and integrity, which are qualities notably absent in previous high surface area filter tubes, particularly those having very deep, closely spaced, cylindrical grooves extending around the circumference of the tube.

While the flow of fluid through the filter tube is essentially in a radial direction, flow in a direction parallel to the axis of the filter tube may take place in the space surrounding the tube. This axial flow tends to cause the lands in previously known filter tubes with deep grooves and thin lands to bend excessively, closing off grooves and reducing the flow rate through the filter. The structure of the present invention has sufficient structural integrity so that such excessive bending does not occur, and flow rate is maintained.

The filter tube of this invention is a disposable filter tube which may be incorporated in the conventional manner in filter cartridges.

Figure 5:
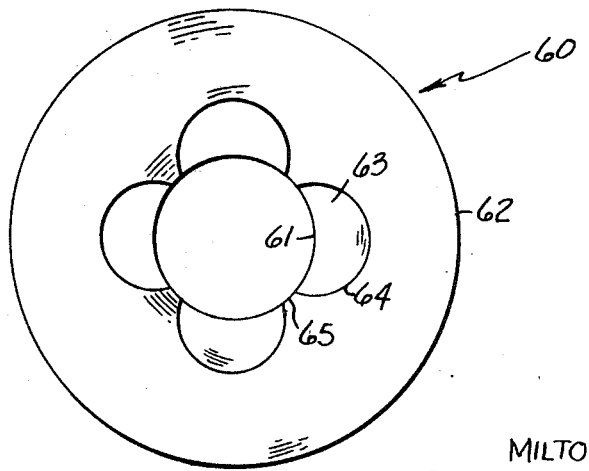

A filter tube designed for radial outward flow, i.e. from the central passageway to the outer periphery of the tube, can also be designed embodying the principles of this invention. Such a filter tube is shown in FIG. 5. The filter tube 60 according to this embodiment of the invention includes inner and outer cylindrical surfaces 61 and 62 respectively, and a plurality of grooves 63 extending from the inner surface 61 toward outer surface 62 without intersecting the latter. Each of the grooves 63 has a bottom wall 64 which intersects inner surface 61 at its ends. Separators 65 separate adjacent grooves. The general technique for forming interior grooves is disclosed in Pat. No. 3,061,157.

Various other modifications can be made without departing from the scope and spirit of this invention.

What I claim is:

1. A filter tube of concentric circumferentially extending layers of bonded fibrous filtering material, said filter tube of fibrous filtering material having:

(a) an outer peripheral surface of fibrous filter material, (b) an inner surface of fibrous filter material providing a passageway extending axially through said tube of fibrous filtering material, and (c) a plurality of channels extending into the fibrous filtering material of the filter tube from the surface of the tube through which the fluid to be filtered will enter, toward, but not to the other surface, said channels being of non-uniform depth in the radial direction and cutting across the concentric circumferentially extending layers of bonded fibrous filtering material.

2. A filter tube of fibrous filtering material according to claim 1 in which said channels are parallel grooves extending along one of said surfaces of the tube of fibrous filtering material through which the fluid to be filtered will enter and from said surface toward, but not to, the other surface and cut across the concentric circumferentially extending layer of bonded fibrous filtering material.

3. A filter tube according to claim 2 in which said grooves extend circumferentially along said one surface of fibrous filtering material through which the fluid to be filtered will enter.

4. A filter tube according to claim 2 in which said grooves extend along said outer peripheral surface of fibrous filtering material comprising the surface through which the fluid to be filtered will enter and radially inwardly toward said inside surface.

5. A filter tube according to claim 4 in which each of said grooves in the surface of the tube of fibrous filtering material through which the fluid to be filtered will enter includes a pair of sidewalls intersecting said outer peripheral surface of fibrous filtering material and a bottom wall intersecting said sidewalls and disposed at a non-uniform distance from said outer peripheral surface of fibrous filtering material.

6. A filter tube according to claim 1 in which said inner and outer surfaces of fibrous filtering material are concentric cylindrical surfaces.

7. A filter tube according to claim 6 in which said channels are parallel grooves extending circumferentially along the surface of fibrous filtering material through which the fluid to be filtered will enter and radially from said surface towards the other surface, said grooves being arranged in a plurality of circumferentially spaced columns, each column having a plurality of axially spaced grooves, said tube of fibrous filtering material including axially extending separators of fibrous filter material between adjacent columns and circumferentially extending lands of fibrous filter material separating adjacent grooves in each column.

8. A filter tube according to claim 7 in which said grooves are in said outer peripheral surface of fibrous filtering material comprising the surface through which the fluid to be filtered will enter.

9. A filter tube according to claim 8 in which each of said grooves includes a pair of sidewalls intersecting said outer peripheral surface of fibrous filtering material and a bottom wall intersecting said sidewalls and disposed at a non-uniform distance from said outer peripheral surface of fibrous filtering material.

10. A filter tube according to claim 9 in which said bottom wall is arcuate, the ends of said bottom wall intersecting said outer peripheral surface of fibrous filtering material.

11. A filter tube according to claim 1 in which said fibrous material comprises glass fibers.

12. A filter tube according to claim 6 in which said fibrous filtering material comprises fibers in thin mat form arranged in a plurality of concentric layers.

13. A cylindrical filter tube of fibrous filtering material, said tube comprising a thin mat of fibers spirally wound on itself to form a plurality of layers, said tube including coaxial inner and outer cylindrical surfaces of fibrous filtering material and a plurality of grooves extending from the coaxial surface of fibrous filtering material through which the fluid to be filtered will enter, toward, but not to, the other surface, the bottoms of said grooves being located at a non-uniform distance from said cylindrical surface and intersecting a plurality of layers of said mat of fibers.

14. A filter tube according to claim 13 in which said fibers are glass fibers.

15. In a cylindrical filter tube of concentric circumferentially extending layers of bonded fibrous filtering material having concentric inner and outer surfaces of fibrous filtering material and a central passageway surrounded by said inner surface, said fibrous filtering material comprising fibers in thin mat form arranged in a plurality of concentric layers, the improvement comprising a plurality of grooves of non-uniform radial depth extending from the surface of fibrous filtering material through which the fluid to be filtered will enter, toward, but not to, the other surface of fibrous filtering material, each of said grooves including a pair of sidewalls extending transversely to the axis of the tube, and a bottom wall parallel to the axis of the tube and intersecting said sidewalls, said bottom wall cutting across a plurality of said concentric circumferentially extending layers of filtering fibers.

16. A filter tube according to claim 15 in which said fibrous material comprises glass fibers.

17. A filter tube according to claim 15 in which said grooves extend from the outer surface of fibrous filtering material toward the inner surface comprising the surface through which the fluid to be filtered will enter.

References Cited

UNITED STATES PATENTS

| 2,537,897 | 1/1951 | Hunter | 210—494 |
|---|---|---|---|
| 2,651,417 | 9/1953 | Malanowski | 210—496X |
| 2,692,685 | 10/1954 | Garland | 210—488 |
| 3,061,107 | 10/1962 | Taylor | 210—496X |
| 3,064,820 | 11/1962 | Gillick, Jr. et al. | 210—488 |
| 3,229,817 | 1/1966 | Pall | 55—529X |
| 3,231,092 | 1/1966 | Goldman | 210—494X |
| 3,347,391 | 10/1967 | Steensen | 210—496X |
| 3,352,423 | 11/1967 | Osterman | 210—496 |

FOREIGN PATENTS

| 537,160 | 2/1957 | Canada | 210—488 |
|---|---|---|---|
| 758,361 | 10/1956 | Great Britain | 210—488 |

JAMES L. DECESARE, Primary Examiner

U.S. Cl. X.R.

210—494, 496